Feb. 6, 1923.
L. P. HALLADAY.
BUMPER BRACKET.
FILED JULY 8, 1921.
1,444,183
2 SHEETS-SHEET 2
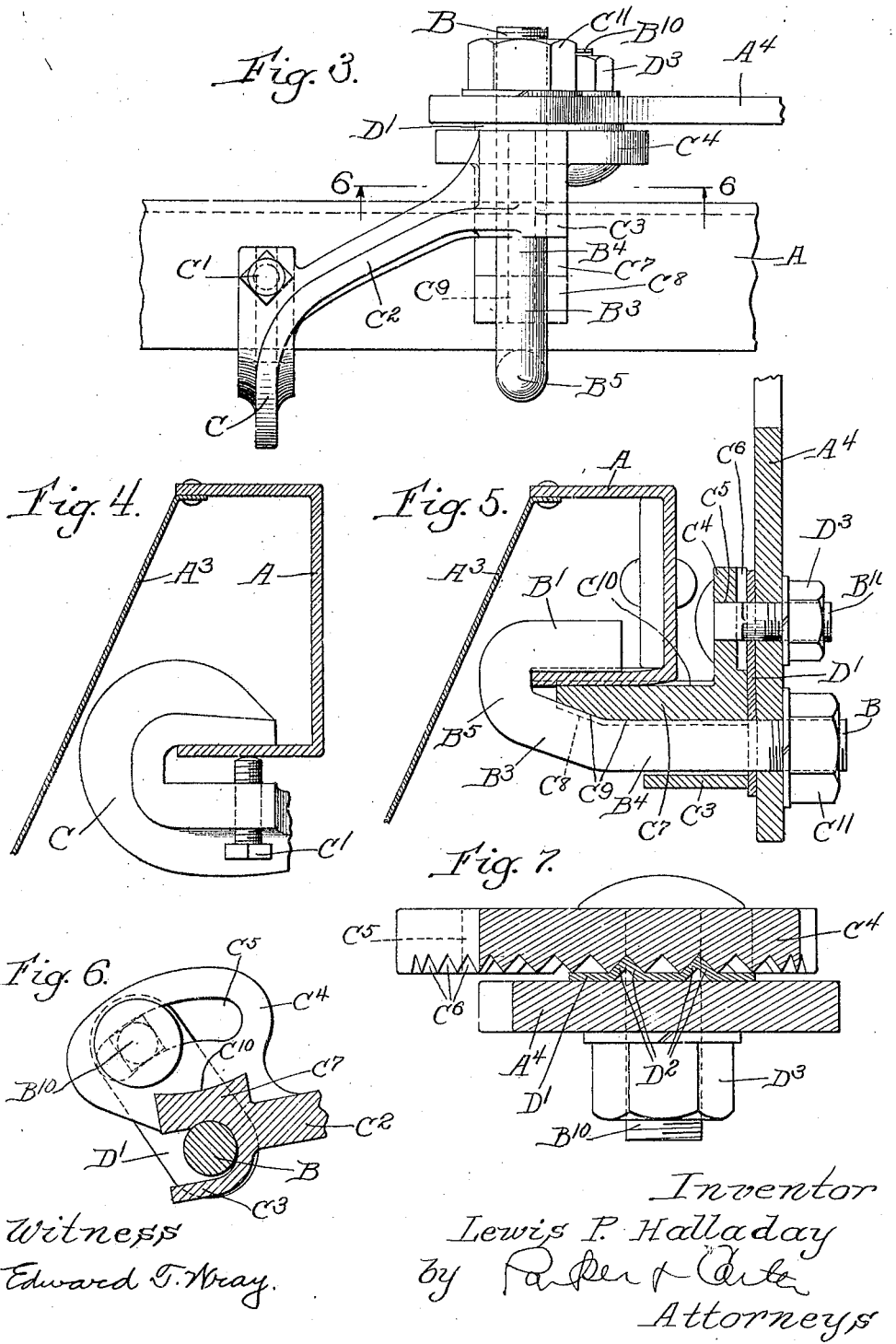
Witness
Edward T. Wray.
Inventor
Lewis P. Halladay
by Parker & Carter
Attorneys Patented Feb. 6, 1923.

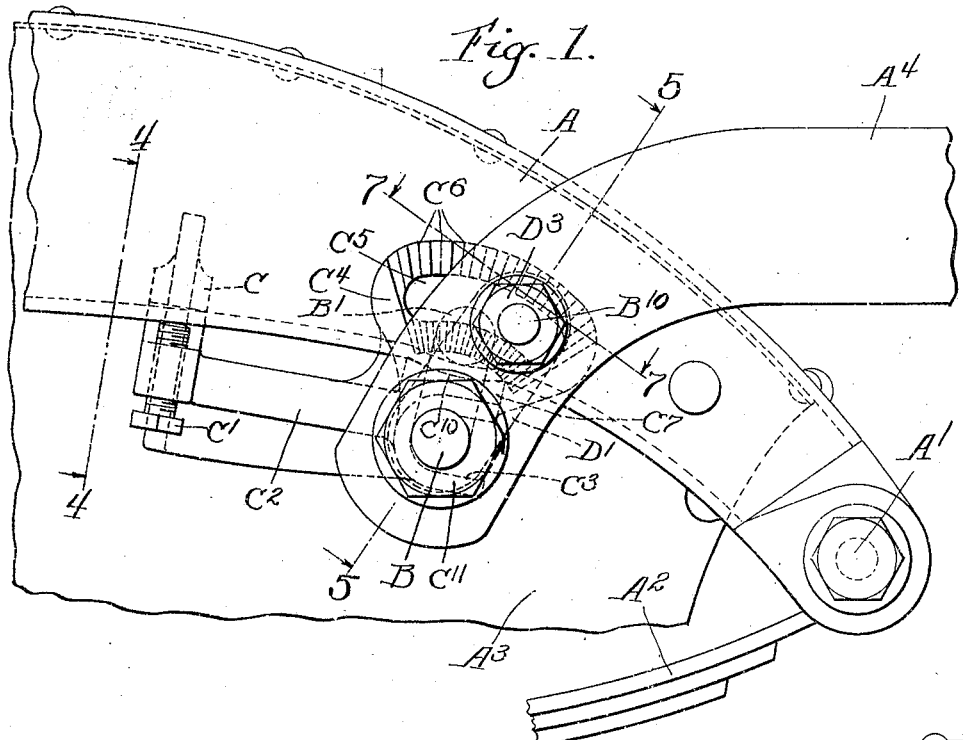
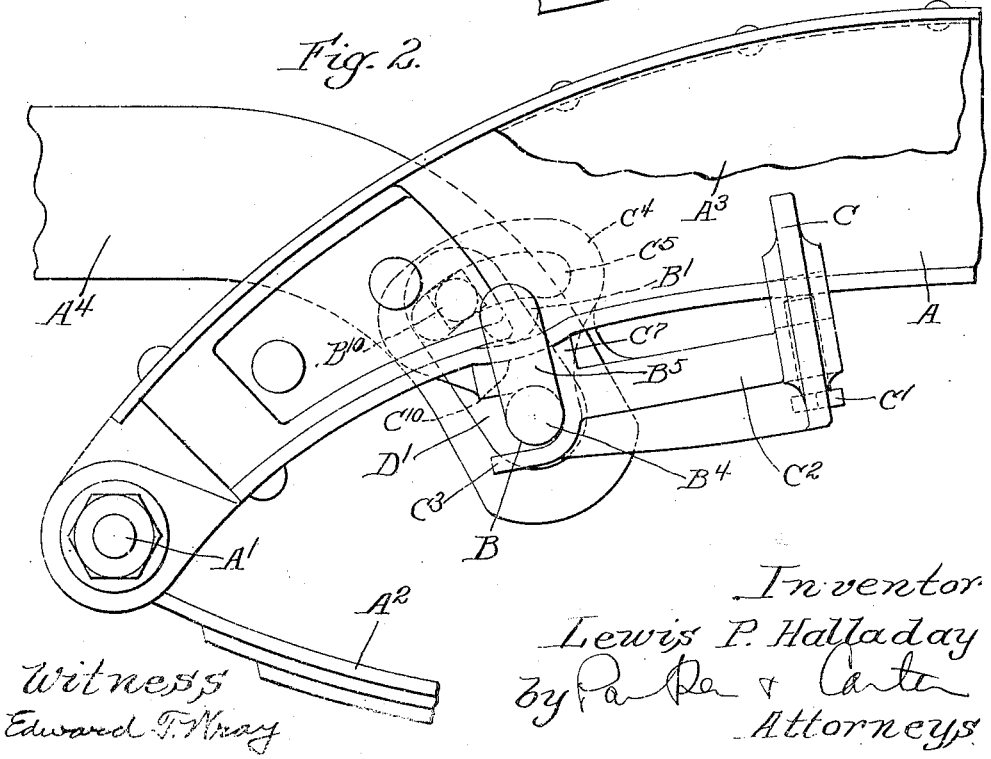

1,444,183

UNITED STATES PATENT OFFICE.

LEWIS P. HALLADAY, OF DECATUR, ILLINOIS.

BUMPER BRACKET.

Application filed July 8, 1921. Serial No. 483,119.

*To all whom it may concern:*

Be it known that I, LEWIS P. HALLADAY, a citizen of the United States, residing at Decatur, in the county of Macon and State of Illinois, have invented a certain new and useful Improvement in Bumper Brackets, of which the following is a specification.

My invention relates to improvements in bumper brackets or attachments for automobiles and the like, and has particular reference to means for attaching an automobile bumper to the front horn of an automobile frame wherein the clamping mechanisms fit in between the lower inwardly extending flange of the frame and the apron so frequently found extending down between the front horns of the frame.

Another object is to provide a form of bumper supporting clamp which will be universally adjustable for all sizes and shapes of automobile frames, and wherein a minimum of adjustments or tightening acts need to be performed in order to attach the bracket in place.

My invention is illustrated more or less diagrammatically in the accompanying drawings, wherein—

Figure 1 is a side elevation of the front end of an automobile showing my bracket attached;

Fig. 2 is a side elevation with parts omitted, the same as Fig. 1 but seen from the opposite side;

Fig. 3 is a bottom plan view;

Fig. 4 is a section along the line 4—4 of Fig. 1;

Fig. 5 is a section along the line 5—5 of Fig. 1;

Fig. 6 is a section along the line 6—6 of Fig. 3;

Fig. 7 is a section along the line 7—7 of Fig. 1.

Like parts are indicated by like characters in all the drawings.

A is a front end or horn of an automobile frame. $A^1$ is a spring bolt, $A^2$ a spring, $A^3$ an apron extending downwardly and inwardly from the upper flange of the frame, and $A^4$ is a forwardly extending bumper supporting arm upon which is mounted a bumper, not here shown.

B is a hook bolt terminating in a hook end $B^1$ adapted to penetrate within the gap between the apron and the lower flange, and to rest upon the upper surface of the lower flange. That part of the hook which rests upon the flange is straight as shown and substantially parallel with the shank. $B^3$ is an inclined portion of the hook extending from the part $B^1$ down to the shank $B^4$, and $B^5$ is a curved connecting portion between the part $B^1$ and the inclined part $B^3$.

C is a clamping hook adapted to pass between the apron and the edge of the flange and rest upon the upper surface of the lower flange. $C^1$ is a set screw associated with this hook, adapted to clamp it tightly up to the flange as shown. $C^2$ is a spacing and positioning arm extending laterally from the plane of the clamping hook and inclined thereto. This arm $C^2$ terminates in a slotted head or fork $C^3$ adapted to engage and straddle the hook bolt B. $C^4$ is a quadrant plate extending upwardly from the slotted head $C^3$. It contains a slot $C^5$ concentric with the center of the hook bolt when that bolt is properly positioned in the slot and the face of the plate adjacent the slot is corrugated as at $C^6$. $C^7$ is a wedge extending inwardly from the quadrant plate beneath and adapted to engage the lower surface of the lower flange. It has an inclined wedging surface $C^8$ on the side opposed to the frame flange, and this surface is grooved as at $C^9$ to prevent possibility of the hook slipping off the wedge. Its upper surface is concave as at $C^{10}$, to grip the flange. When the parts are in proper position as shown, the inclined surface of the wedge engages the inclined surface of the hook bolt and these two surfaces are parallel, so that tightening upon the nut $C^{11}$ tends to draw or hold the curved portion of the hook against the edge of the flange and force the wedge into the angular space between the two branches of the hook and clamp the hook and the wedge firmly into position on the flange.

The bumper supporting bar $A^4$ has two bolt holes therethrough, as shown in Fig. 5, one of them engaging the hook bolt B, the other a locking bolt $B^{10}$ which also passes through the slot $C^5$. $D^1$ is a locking plate pivoted on the bolt D resting against the member $A^4$ and having a plurality of upwardly extending ribs $D^2$ adapted to engage the corrugations $C^6$. The nuts $D^3$ and $C^{11}$ are adapted to be tightened on their respective bolts when the parts are in position, to hold the slotted head in position on the hook bolt and wedge the parts together and to lock the plate $D^1$ into engagement with the corrugations, thereby preventing angular movement of the bracket supporting bar.

It will be evident that while I have shown in my drawings an operative device, still many changes might be made in size, shape and arrangement of parts without departing materially from the spirit of my invention, and I wish, therefore, that my drawings be regarded as in a sense diagrammatic.

The use and operation of my invention are as follows:

The operator first inserts the clamping hook in the space between the flange and the apron and rotates it through an angle of 90 degrees into the position shown in Fig. 7. He then passes the hook bolt through the space between the flange and the apron; rotates it at an angle of 90 degrees in a plane parallel with the underside of the flange until it engages the slotted head associated with the clamping hook, with the hook bolt resting upon the wedge and engaged by the groove therein. He then tightens up on the set screw to lock the clamping hook in position. He then may tighten up the bolt to force the wedge and hook bolt together so as to provide a wedging action and force the clamping part of the mechanism into the proper relative positions. He then would slacken off with the nut, remove it from the bolt, apply the bumper supporting bar, pivoting it on the hook bolt with the short holding bolt passing through the quadrant plate and the bar, and with the locking plate in place would tighten up the two bolts and the set screw again, and thus all the parts will be permanently and rigidly held in position.

That part of the hook bolt which engages the top upper side of the flange is normally parallel therewith, when seated, and the wedge portion which engages the opposite side of the flange is concave, so that the flange is gripped between a convex surface and a concave surface and tends to be distorted therebetween as the wedge is tightened in place, thus seating the hook bolt extremely firmly on the flange.

I claim:

1. A clamp for automobile bumpers and the like comprising two opposed clamping members adapted to be secured to each other and to the flange of the automobile frame at one point and additional means for securing one of said members to the flange at another point.

2. A clamp for automobile bumpers and the like comprising two opposed clamping members adapted to be secured to each other and to the flange of the automobile frame at one point and additional means for securing one of said members to the flange at another point comprising a lateral flange engaging projection therefrom and means for locking it upon the flange.

3. A clamp for automobile bumpers and the like comprising two opposed clamping members adapted to be secured to each other and to the flange of the automobile frame at one point and additional means for securing one of said members to the flange at another point, one of said members comprising a flange surrounding element and the other comprising a wedge adapted to penetrate between said flange surrounding element and the flange and means for giving the two elements a relative axial movement.

4. An automobile bumper clamp comprising a hook bolt, one arm of which is adapted to engage the flange of an automobile frame, and a wedge shaped member adapted to be inserted between one arm of said hook bolt and said flange, and means for forcing it therein to clamp said clamp about said flange, said member being adapted partially to surround, and to be aligned by said hook bolt arm.

5. An automobile bumper clamp comprising a hook bolt, one arm of which is adapted to engage the flange of an automobile frame, a separate clamping hook adapted to engage the frame at a point removed from the hook bolt, a member integral with said clamping hook in engagement with said hook bolt and means for drawing it and said hook bolt together to clamp both against the flange.

6. An automobile bumper clamp comprising a hook bolt, one arm of which is adapted to engage the flange of an automobile frame, the opposite arm of which is formed with a surface spaced away from and inclined to said flange, a separate clamping hook adapted to engage the frame at a point removed from the hook bolt, an extension integral therewith and adapted to engage said hook bolt, a wedge shaped portion thereon adapted to penetrate between the inclined surface of the hook bolt and the flange and means for forcing it therebetween to clamp the hook bolt and wedge member against said flange.

7. An automobile bumper clamp comprising a hook bolt one arm of which is adapted to engage the flange of an automobile frame, a separate clamping hook adapted to engage the frame at a point removed from the hook bolt, a member integral with said clamping hook in engagement with said hook bolt, a wedge shaped portion integral therewith and means for drawing it between one arm of said hook bolt and said flange to clamp both members against the flange.

8. An automobile bumper clamp comprising a hook bolt one arm of which is adapted to engage the flange of an automobile frame, a separate clamping hook adapted to engage the frame at a point removed from the hook bolt, a member integral with said clamping hook in engagement with said hook bolt, a wedge shaped portion integral therewith and means for drawing it between one arm of said hook bolt and said flange, to clamp both members against the flange, comprising means on said hook bolt adapted to grip and axially move said member toward said hook bolt.

9. An automobile bumper clamp comprising a hook bolt, one arm of which is adapted to engage the flange of an automobile frame, and a wedge shaped member adapted to be inserted between one arm of said hook bolt and said flange, means for forcing it therein to clamp said clamp about said flange, a bumper supporting arm pivoted to said hook bolt, a quadrant-shaped member secured to said wedge-shaped member, and means for adjustably securing said arm to said quadrant.

10. An automobile bumper clamp comprising a U-shaped member, one arm of which is adapted to engage the flange of an automobile frame, and a wedge shaped member adapted to be inserted between one arm of said U-shaped member and said flange, and means for forcing it therebetween to clamp said clamp upon said flange, and means for securing the bumper directly to said U-shaped member.

11. An automobile bumper clamp comprising a U-shaped member, one arm of which is adapted to engage the flange of an automobile frame, and a wedge shaped member adapted to be inserted between one arm of said U-shaped member and said flange, and means for forcing it therebetween to clamp said clamp upon said flange, and means for securing the bumper directly to said U-shaped member, and a bearing face upon said wedging member adapted to engage said bumper.

12. An automobile bumper clamp comprising a U-shaped member one arm of which is adapted to engage the flange of an automobile frame, and a wedge shaped member adapted to be inserted between one arm of said U-shaped member and said flange, and means for forcing it therebetween to clamp said clamp upon said flange, and means for securing the bumper directly to said U-shaped member, and a bearing face upon said wedging member adapted to engage said bumper, and separate means for securing it thereto.

13. An automobile bumper clamp comprising a U-shaped member, one arm of which is adapted to engage the flange of an automobile frame, and a wedge shaped member adapted to be inserted between one arm of said U-shaped member and said flange, and means for securing the bumper directly to said U-shaped member, and a bearing face upon said wedging member adapted to engage said bumper, and separate adjustable means for securing it thereto.

14. An automobile bumper clamp comprising a U-shaped member, one arm of which is adapted to engage the flange of an automobile frame, and a wedge shaped member adapted to be inserted between one arm of said U-shaped member, and said flange, and means for forcing it therein to clamp said clamp upon said flange, and means for securing the bumper to said U-shaped member, and a bearing face upon said wedging member adapted to engage said bumper, and separate adjustable means for securing it thereto, comprising in part an arcuately slotted quadrant.

15. A clamp for automobile bumpers and the like comprising a bumper engaging and supporting member adapted partially to surround the flange of the automobile frame member, an inclined surface thereon, and a wedge adapted to be interposed between said member and the flange and means for relatively moving the two members adapted to clamp both members to each other and against the frame.

Signed at Chicago, county of Cook and State of Illinois, this 30th day of June 1921.

LEWIS P. HALLADAY.